United States Patent
Koh et al.

(10) Patent No.: US 8,221,541 B2
(45) Date of Patent: Jul. 17, 2012

(54) HEAVY WEIGHT CONCRETE COMPOSITION USING SLAG BYPRODUCTS

(75) Inventors: Tae Hoon Koh, Gyeonggi-Do (KR); Seong Ho Han, Seoul (KR); Seon Keun Hwang, Gyeonggi-Do (KR); Tae Hwan Ko, Gyeonggi-Do (KR)

(73) Assignee: Korea Railroad Research Institute, Gyeonggi-Do (KR)

( * ) Notice: Subject to any disclaimer, the term of this patent is extended or adjusted under 35 U.S.C. 154(b) by 0 days.

(21) Appl. No.: 13/389,440

(22) PCT Filed: Sep. 30, 2010

(86) PCT No.: PCT/KR2010/006659
§ 371 (c)(1),
(2), (4) Date: Feb. 8, 2012

(87) PCT Pub. No.: WO2011/040768
PCT Pub. Date: Apr. 7, 2011

(65) Prior Publication Data
US 2012/0137933 A1    Jun. 7, 2012

(30) Foreign Application Priority Data

Oct. 1, 2009   (KR) .......... 10-2009-0093901
Sep. 29, 2010  (KR) .......... 10-2010-0094051

(51) Int. Cl.
C04B 18/14    (2006.01)
C04B 24/06    (2006.01)
E01B 3/28     (2006.01)

(52) U.S. Cl. ........................ 106/714; 106/789
(58) Field of Classification Search .......... 106/714, 106/789
See application file for complete search history.

(56) References Cited

U.S. PATENT DOCUMENTS

| | | | |
|---|---|---|---|
| 4,124,404 A * | 11/1978 | Suzuki et al. ............. 106/765 |
| 5,393,342 A * | 2/1995 | Hooykaas ................ 106/714 |
| 6,491,751 B1 * | 12/2002 | Watson ................. 106/756 |
| 2007/0095255 A1 * | 5/2007 | Abbate et al. ............. 106/713 |
| 2008/0017077 A1 * | 1/2008 | Abbate ................. 106/679 |
| 2010/0126389 A1 * | 5/2010 | Otsuka et al. ............. 106/708 |
| 2010/0282130 A1 * | 11/2010 | Higo et al. .............. 106/643 |

FOREIGN PATENT DOCUMENTS

| | | |
|---|---|---|
| JP | 2001-254302 | 9/2001 |
| JP | 2005029404 A * | 2/2005 |
| JP | 2006273689 A * | 10/2006 |
| JP | 2006273690 A * | 10/2006 |
| JP | 2006273692 A * | 10/2006 |
| JP | 2006273693 A * | 10/2006 |
| JP | 2007210848 A * | 8/2007 |
| JP | 2007269557 A * | 10/2007 |
| KR | 10-0451821 | 10/2004 |
| KR | 10-2006-0119506 | 11/2006 |
| KR | 10-0693391 | 3/2007 |
| KR | 10-0694267 | 3/2007 |
| WO | WO2011/134025 A1 * | 11/2011 |

OTHER PUBLICATIONS

Derwent-Acc-No. 2009-N36878, abstract of CN 101514094A (Aug. 2009).*
Wu et al, "Utilization of steel slag as aggregates for stone mastic asphalt (SMA) mixtures", Building and Environment, Jul. 2007, pp. 2580-2585, vol. 42, Issue 7.
Qasrawi et al., "Use of low CaO unprocessed steel slag in concrete as fine aggregate", Construction and Building Materials, Feb. 2009, pp. 1118-1125, vol. 23, Issue 2.

* cited by examiner

Primary Examiner — Anthony J Green
(74) Attorney, Agent, or Firm — Jianq Chyun IP Office

(57) ABSTRACT

Disclosed is a heavyweight concrete composition using slag byproducts, including: ground granulated blast furnace slag; slow-cooled electric-arc-furnace oxidizing slag or atomized steel slag used as a fine aggregate; a coarse aggregate; water; and a chemical admixture based on 100 parts by weight high-early-strength cement. Thus, the heavyweight concrete composition contains a large quantity of steel slag and blast-furnace slag that are byproducts in iron-making and steel-making processes, thereby remarkably reducing an amount of emission of carbon dioxide and maximizing the recycling of waste resources for preserving the natural environment. As a result, an eco-friendly heavyweight concrete product can be made.

4 Claims, No Drawings

HEAVY WEIGHT CONCRETE COMPOSITION USING SLAG BYPRODUCTS

CROSS-REFERENCE TO RELATED APPLICATION

This application is a 371 of international application of PCT application serial no. PCT/KR2010/006659, filed on Sep. 30, 2010, which claims the priority benefit of Korea Application No. 10-2009-0093901, filed on Oct. 1, 2009, and claims the priority benefit of Korean Application No. 10-2010-0094051, filed on Sep. 29, 2010. The entirety of each of the above-mentioned patent applications is hereby incorporated by reference herein and made a part of this specification.

TECHNICAL FIELD

The present invention relates to a heavyweight concrete composition using slag produced as a byproduct in the steel industry, and more particularly, to a heavyweight concrete composition using slag byproducts, in which the slag byproducts (steel slag and blast-furnace slag) are efficiently used as fine aggregates for concrete and binders for an alternative to cement so as to be eco-friendly and excellent in mechanical properties such as a compressive strength, and which is particularly favorable to heavyweight concrete products such as railroad (or railway) prestressed concrete (PC) sleepers.

BACKGROUND ART

A large quantity of blast-furnace slag and steel slag are annually produced as industrial byproducts at steel mills. Since efforts to develop the use and application of the byproducts have been insufficient in light of the quantity of production, the byproducts are for the most part reclaimed or left behind in in-house sites. As a result, a serious environmental problem has been raised.

These byproducts are, however, materials that can be sufficiently recycled by proper screening and processing. Particularly, when the blast-furnace slag is used as an alternative to cement among materials for concrete in the construction and building fields, an amount of emission of carbon dioxide generated in the process of producing cement is reduced. The steel slag can replace natural sand as an alternative resource of fine aggregate, so that it can minimize environmental destruction caused by digging sand.

As for the related art, for example, Korean Patent No. 10-0693391 (Patent Document 1) discloses an eco-friendly colorizing concrete composition using steel slag and blast-furnace slag.

Korean Patent No. 10-0694267 (Patent Document 2) discloses marine concrete using steel slag as an aggregate.

Korean Patent No. 10-0451821 (Patent Document 3) discloses a method of increasing an initial strength of concrete using blast-furnace slag cement.

Meanwhile, as a component of a railroad (or railway) track, a sleeper serves to keep the gauge of a track constant, support the train load, and widely distribute the train load to the ballast and roadbed. The sleeper is usually made up of a concrete sleeper body and a fastener for fixing a rail to the concrete body.

Such a sleeper requires a sufficient strength so as to be able to support the train load, and is mainly manufactured with a heavyweight concrete product to effectively secure stability against the track buckling.

Heavyweight concrete products such as railroad (or railway) sleepers have a required strength (a compressive strength of 50 MPa). Since sleepers are exposed to natural environmental factors such as sunlight, snow, rain, varying temperatures, and so on, eco-friendly products are preferable. The heavyweight concrete products such as railroad (or railway) sleepers have not yet been manufactured by adding industrial byproducts such as blast-furnace slag and steel slag.

DISCLOSURE

Technical Problem

The present invention is made to manufacture a concrete composition favorable to, particularly, heavyweight concrete products, as a part of making environmentally efficient use of blast-furnace slag and steel slag, which are typical byproducts generated in iron-making and steel-making processes, in an eco-friendly manner.

The present invention is, therefore, directed to a concrete composition that contains blast-furnace slag and steel slag so as to be eco-friendly and be able to have desirable strength, durability, and environmental characteristics, which are particularly required for heavyweight concrete products such as railroad (or railway) prestressed concrete (PC) sleepers.

The present invention is also directed to a heavyweight concrete composition that, when preparing the aforementioned concrete composition, replaces natural fine aggregates with atomized steel slag or slow-cooled electric-arc-furnace oxidizing slag so as to be able to have desirable strength, durability, and environmental characteristics that are required for heavyweight concrete products.

Technical Solution

To accomplish the objectives, an aspect of the present invention provides a heavyweight concrete composition using an atomized steel slag byproduct, which includes: on the basis of 100 parts by weight high-early-strength Portland cement, 15 to 30 parts by weight ground granulated blast-furnace slag, 220 to 280 parts by weight atomized steel slag having a density of 3.4 to 3.6 and used as a fine aggregate, 230 to 300 parts by weight crushed stone used as a coarse aggregate, and 30 to 40 parts by weight water.

Further, the heavyweight concrete composition using an atomized steel slag byproduct may further include a fiber reinforcement, a chemical admixture, or a combination thereof.

Furthermore, another aspect of the present invention provides a heavyweight concrete composition using a slow-cooled electric-arc-furnace oxidizing slag byproduct, which includes: on the basis of 100 parts by weight high-early-strength cement, 42 to 67 parts by weight ground granulated blast-furnace slag, 290 to 310 parts by weight slow-cooled electric-arc-furnace oxidizing slag having a density of 3.3 to 3.8 and used as a fine aggregate, 260 to 290 parts by weight coarse aggregate, and 40 to 45 parts by weight water.

In the present invention, a part of cement that is a binder of the concrete composition basically makes use of blast-furnace slag having latent hydraulicity under an alkali environment and steel slag serving as a fine aggregate, wherein slow-cooled electric-arc-furnace oxidizing slag is used as the steel slag.

This slow-cooled electric-arc-furnace oxidizing slag is processed by transporting molten high-temperature electric-arc-furnace oxidizing slag to a cooling pit, naturally cooling the transported slag with the lapse of time, i.e., slowly cooling and solidifying the transported slag, transferring the solidified slag to a crushing line, and crushing and screening the crushed slag to a predetermined size via step-by-step crushing processes, thereby allowing iron components to be removed by a magnet in the crushing line.

This slow-cooled electric-arc-furnace oxidizing slag does not require various processes and facilities for fast cooling unlike the atomized steel slag (fast-cooled electric-arc-furnace oxidizing slag), is produced at a low cost due to inexpensive mass production, and secures an important function of sufficiently exerting desired physical properties when used as the fine aggregate.

Further, the concrete composition of the present invention may further include a chemical admixture.

Advantageous Effects

The present invention is important technology in satisfying needs to reduce carbon dioxide emission, and develop eco-friendly construction materials based on recycling of waste resources on the basis of the concept of sustainable development for solving an environmental problem that is a major issue of the twenty-first century all over the world, and has effects of preserving the environment and recycling resources.

That is, the present invention is used for concrete products, provides excellent mechanical properties, and allows a considerable amount of cement and natural sand to be replaced with slag, an industrial byproduct. As such, the present invention contributes to improvement in air quality environment and preservation of the natural environment by reducing carbon dioxide emission. The present invention provides a simple process for recycling the steel slag, which is a designated byproduct, and a higher economic efficiency due to mass production than an existing natural aggregate, and is eco-friendly because heavy metals are hardly leached.

Further, since the present invention makes use of iron and steel slags, particularly atomized steel slag and slow-cooled electric-arc-furnace oxidizing slag, that are for the most part reclaimed or discarded, it can secure required mechanical properties, reduce the production cost of a concrete product, and provide a very efficient concrete composition.

BEST MODE

Hereinafter, specific examples of the present invention will be described below in detail regarding a heavyweight concrete composition using an atomized steel slag byproduct and a heavyweight concrete composition using a slow-cooled electric-arc-furnace oxidizing slag byproduct.

[Heavyweight Concrete Composition Using Atomized Steel Slag Byproduct]

A heavyweight concrete composition using an atomized steel slag byproduct includes high-early-strength Portland cement, ground granulated blast-furnace slag, atomized steel slag as a fine aggregate, crushed stone as a coarse aggregate, and water.

The cement used in the present invention is third class (high-early-strength) cement (hereinafter referred to as "high-early-strength cement"), which has a very excellent strength, in accordance with KS L 5201 (Portland cement).

Cement has been generally used as a very important material in the civil engineering industry. However, the cement is responsible for causing environmental problems due to a large quantity of carbon dioxide ($CO_2$) gas emission, the chief culprit of climate warming, generated in its production process. Thus, it is very preferable to reduce the amount of cement used for its own sake in an environmental aspect.

As such, the present invention uses the ground granulated blast-furnace slag that is industrial waste as an alternative to cement.

The ground granulated blast-furnace slag is obtained by drying and pulverizing granulated blast-furnace slag made by rapidly cooling blast-furnace slag, which is generated as a byproduct in a high-temperature molten state when pig iron is produced.

That is, the blast-furnace slag is a sort of waste that is generated by reaction of argillaceous minerals such as silica, which is an impurity existing in iron ore and cokes when pig iron is produced in a blast furnace at a steel mill, and ash with limestone at high temperature. When the blast-furnace slag is slowly cooled in the air, it becomes pelletized slag of a stable porous agglomerate. In contrast, when the blast-furnace slag is rapidly cooled under water, it becomes granulated slag of unstable vitreous granulate.

When the granulated slag is exposed to alkalinity, its microstructure is destroyed, so that a material such as reactive silica is leached. This material directly reacts with alkali, thereby generating a hydrated product as in a hydration reaction of cement, developing hydraulicity. That is, the hydrated product takes a role similar to cement, and thus can replace the cement.

According to the present invention, the ground granulated blast-furnace slag is used at an amount of 15 to 30 parts by weight on the basis of 100 parts by weight high-early-strength cement.

If the blast-furnace slag is less than 15 parts by weight, an effect of increasing long-term sustainable strength and chloride ion resistance caused by addition of the ground granulated blast-furnace slag is low. If the blast-furnace slag exceeds 30 parts by weight, a content of the blast-furnace slag is increased, and a percentage of the high-early-strength Portland cement is relatively reduced, so that initial or 28-day strength development is lowered, and an amount of a binder (high-early-strength cement+blast-furnace slag) used to mix concrete in order to meet a required strength is increased, which is unfavorable in an economical aspect.

Meanwhile, the iron and steel industries consume large quantities of raw materials and energy, and generate a large quantity of steel slag as a byproduct through complicated production processes such as iron-making, steel-making, rolling, and so on.

This steel slag is an industrial waste from a converter furnace or an electric arc furnace in which steelmaking raw materials such as pig iron, scrap iron, and so on are refined. When the steel slag is discharged without being used efficiently, environmental problems such as dust scattering and leachate take place, and economical problems such as the necessity for a large-scale landfill space take place as well. For this reason, various studies have been made to make efficient use of the steel slag.

The steel slag is a material that is more lightweight than iron and is substantially separated by a difference in specific gravity. The steel slag hardly contains heavy metals, and thus is low in environmental harmfulness. As such, researches on use of the steel slag as a construction industrial material have been relatively active.

However, since the steel slag contains free-calcium oxide (CaO), it causes a chemical reaction when contacting water, and undergoes volumetric expansion. Thus, when the steel slag is used for roads or concrete, it causes cracks. In this case, a method in which the steel slag is chemically stabilized by a post-treatment process such as aging has been proposed, but it is still low in reliability, so that its application is rare in practice.

However, a method of rapidly cooling the molten steel slag using high-speed air to thereby control an amount of free-CaO generated has recently been developed.

The steel slag obtained by this method is called either atomized steel slag (ASS) because it is spherized, or rapidly cooled steel slag (RCSS) because it is obtained by a rapid cooling process.

The ASS has a low possibility of expansion collapse caused by free-CaO, and has the shape of a fine aggregate which is near a spherical particle shape. As such, when the ASS is used as a concrete construction material, it has an advantage in that fluidity of concrete is increased by a ball bearing effect, but a disadvantage in that it is rarely applied to other usages than special concrete due to segregation possibility caused by high density, compared to other materials.

According to the present invention, quality characteristics for a fine aggregate of the ASS are generally good except that fine particles of 0.3 mm or less are small particles less than a reference value.

Particularly, since sleepers are railroad components required to be heavyweight for stabilization, a high density (3.4 to 3.6) of ASS is advantageous over an existing fine aggregate (sand having a density of 2.5 to 2.6).

Since the particle shape of the ASS is near a spherical shape, an effect of improving the fluidity of concrete and an effect of enhancing the compressive strength of concrete are obtained when the ASS is used as a fine aggregate and/or coarse aggregate for a concrete composition.

In the present invention, the ASS is used as an alternative of the fine aggregate such as sand at an amount of 220 to 280 parts by weight on the basis of 100 parts by weight high-early-strength Portland cement.

If the ASS is less than 220 parts by weight, workability is reduced due to relatively harsh concrete, and a concrete has a rough surface when molded. In contrast, if the ASS is used at more than 280 parts by weight, a content ratio of the coarse aggregate is relatively reduced, so that a unit water content is increased so as to obtain required workability, an amount of the binder is increased, and the shrinkage of a concrete sleeper is increased so as to reduce its stability.

Further, in the present invention, the coarse aggregate (a maximum size of about 20 mm) is used after being dried so that the water content is less than 0.05%. As the coarse aggregate, any one of river gravel and crushed stone that are generally used for concrete is not restricted. The coarse aggregate is preferably used at an amount of 230 to 300 parts by weight on the basis of 100 parts by weight of high-early-strength Portland cement.

If the coarse aggregate is less than 230 parts by weight, an amount of cement used is increased. In contrast, if the coarse aggregate is more than 300 parts by weight, a degree of filling of cement is reduced, so that the strength of concrete is reduced.

A final component, i.e. water, is used at an amount of 30 to 40 parts by weight on the basis of 100 parts by weight high-early-strength Portland cement in order to uniformly mix the aforementioned components. The amount of water is not substantially limited to this amount, and thus may be modified by a proper choice of the person skilled in the art.

Further, although not essential components, the heavyweight concrete composition may further include a fiber reinforcement and/or a chemical admixture. The fiber reinforcement is preferably hydrophilic synthetic nylon fiber used for the reduction of cracks of concrete and for secondary reinforcement of cured concrete.

A high-range air-entraining (AE) water reducing agent based on polycarboxylic acid may be used as the chemical admixture.

According to the present invention, the concrete mix composition for producing the heavyweight concrete product, particularly the railroad (or railway) sleeper, is very important in the development of effects such as consistent strength, chloride ion resistance, stability, workability, etc. which are required to produce the sleeper.

[Heavyweight Concrete Composition Using Slow-Cooled Electric-Arc-Furnace Oxidizing Slag]

The ASS as mentioned above is very efficient in the concrete mix composition for producing a heavyweight concrete product such as the railroad (or railway) sleeper, and has various advantages as the alternative to the fine aggregate.

However, since an atomizing technique is possessed by a domestic monopolistic enterprise, factories are limited to certain locations. Thus, various problems such as an increase in transportation cost, a short supply caused by a relatively small quantity of production, an increase in material cost according to operation of expensive facilities, and so on occur. As such, it is impossible to avoid increasing a price of the alternative fine aggregate produced using this technique.

Accordingly, the stability and reliability of this inefficient material supply are brought into question, so that its use is necessarily highly restricted. For this reason, the present invention presents a heavyweight concrete composition using slow-cooled electric-arc-furnace oxidizing slag instead of the ASS.

Thus, without using the ASS, which is more expensive than a natural fine aggregate and is restricted in production areas (two) and annual production quantity (200,000 ton/year at two iron and steel mills), it is possible to provide the heavyweight concrete composition that can have the strength, durability, and environmental characteristics particularly required for heavyweight concrete products, using the slow-cooled electric-arc-furnace oxidizing slag, which is less expensive than the natural fine aggregate.

The heavyweight concrete composition using a slow-cooled electric-arc-furnace oxidizing slag byproduct includes high-early-strength cement, ground granulated blast furnace slag; slow-cooled electric-arc-furnace oxidizing slag as a fine aggregate, crushed stone as a coarse aggregate, and water.

The cement used in the present invention is third class (high-early-strength) cement, which has a very excellent strength in accordance with KS L 5201 (Portland cement).

Cement has been generally used as a very important material in the civil engineering industry. However, cement is responsible for causing environmental problems because a large quantity of carbon dioxide ($CO_2$) gas, the chief culprit of climate warming, is emitted in the process of producing the cement ($CO_2$ of about 0.9 to 1.0 ton is emitted when cement of 1.0 ton is produced). Thus, it is very preferable to reduce an amount of use of the cement which is used as a construction material under the background of green growth, for its own sake in the environmental aspect.

In the present invention, the ground granulated blast-furnace slag, the industrial byproduct, is used as a partial alternative to cement at an amount of 42 to 67 parts by weight on the basis of 100 parts by weight high-early-strength cement.

If the blast-furnace slag is less than 42 parts by weight, an effect of increasing long-term sustainable strength and chloride ion resistance caused by addition of the ground granulated blast-furnace slag is reduced. If the blast-furnace slag exceeds 67 parts by weight, a percentage of the high-early-strength cement is relatively reduced, and thus initial or 28-day strength development is lowered, so that an amount of a binder (high-early-strength cement+blast-furnace slag) used to meet a required strength is forced to be increased. Accordingly, if the ground granulated blast-furnace slag exceeds 67 parts by weight, this is rather unfavorable in an economical aspect.

Meanwhile, the iron and steel industries consume large quantities of raw materials and energy, and generate a large quantity of blast-furnace slag as well as steel slag while passing through complicated production processes such as iron-making, steel-making, rolling, and so on.

This steel slag is a material that is more lightweight than iron and is substantially separated in a high-temperature molten state by a difference in specific gravity. The steel slag hardly contains any heavy metal, and thus has low environmental harmfulness. As such, researches on use of the steel slag as a construction industrial material have been relatively active.

As described above, however, since the steel slag contains free-CaO, it causes a chemical reaction when it contacts water, and undergoes volumetric expansion. Thus, when the steel slag is used for roads or concrete, it causes cracks. In this case, a method in which the steel slag is used after being chemically stabilized by a post-treatment process such as aging is proposed.

However, a method of rapidly cooling the molten steel slag using high-speed air to thereby control an amount of free-CaO generated has recently been developed. The ASS (rapid-cooled) is obtained by this method.

However, for the ASS (rapid-cooled), it is inevitably required to operate expensive special facilities for providing a special atomizing process (possessed by a domestic monopolistic enterprise) and to modify existing facilities for material transportation and storage, and is more expensive than a natural fine aggregate (sand) due to a short supply caused by a relatively small quantity of production, so that its applicability is low at present. Thus, there is a need for an alternative coping with these problems. In the present invention, the slow-cooled electric-arc-furnace oxidizing slag is used as the fine aggregate.

First, the steel slag is generally divided into converter-furnace slag and electric-arc-furnace slag. Particularly, the electric-arc-furnace slag refers to steel slag generated from an electric arc furnace rather than a converter furnace (or a blast furnace).

Typically, the electric arc furnace is widely used at home and abroad due to environmental problems, compared to the converter furnace (in Korea, Pohang and Gwangyang steel mills). For this reason, the present invention is directed to using the easily purchasable electric-arc-furnace slags, particularly the electric-arc-furnace oxidizing slag whose stability as aggregate is proved at home and abroad.

This is because, among the electric-arc-furnace slags, the electric-arc-furnace oxidizing slag has a relatively lower content of free-CaO than electric-arc-furnace reducing slag, and thus is chemically stable.

That is, the ASS is based on a method of controlling the leaching of free-CaO due to its spinel structure. Since the atomizing method contributes to increase in the cost of production of the steel slag, the slow-cooled electric-arc-furnace oxidizing slag with a low content of free-CaO is used.

Since the slow-cooled electric-arc-furnace oxidizing slag is the steel slag generated from the electric arc furnace, it secures the stability of material supply due to various worldwide production areas (seven areas in Korea) and a sufficient quantity of production (about 5,000,000 ton/year at ten steel mills), and the reliability of a material itself (KS F 4571: electric-arc-furnace oxidizing slag aggregate for concrete), and is intended to remove harmful factors caused by expansibility even when used as a fine aggregate in the concrete composition due to a low content of free-CaO.

Particularly, since concrete sleepers are products that are required to be heavyweight for stabilization (formed of heavyweight concrete) to secure the stability against track buckling, it can be found that a high density (3.3 to 3.8) of slow-cooled electric-arc-furnace oxidizing slag is advantageous over an existing natural fine aggregate (whose density ranges from 2.5 to 2.6).

In the present invention, the slow-cooled electric-arc-furnace oxidizing slag is used as an alternative of the fine aggregate such as sea sand, crushed sand, or the like at an amount of 290 to 310 parts by weight on the basis of 100 parts by weight high-early-strength cement.

If the slow-cooled electric-arc-furnace oxidizing slag is less than 290 parts by weight, workability is relatively reduced so that a concrete has a rough surface when molded. In contrast, if the slow-cooled electric-arc-furnace oxidizing slag is more than 310 parts by weight, a percentage of the coarse aggregate is relatively reduced, so that the shrinkage possibility of a concrete product is increased, which may reduce its stability. Further, both a unit water content and an amount of the binder are increased so as to obtain required workability, so that the durability and economic efficiency of a concrete product may be reduced.

Further, in the present invention, the coarse aggregate (a maximum size of 20 mm) can employ river gravel or crushed stone that are generally used for concrete, and is used at an amount of 260 to 290 parts by weight on the basis of 100 parts by weight high-early-strength cement.

If the coarse aggregate is less than 260 parts by weight, a content of cement is increased. In contrast, if the coarse aggregate is more than 290 parts by weight, a degree of filling of cement is reduced, so that the strength of concrete is reduced.

As a final component, water is used at an amount of 40 to 45 parts by weight on the basis of 100 parts by weight high-early-strength cement in order to uniformly mix the aforementioned components.

In addition, as a chemical admixture for reducing the unit water content and securing an amount of entrained air, a high-range water reducing agent based on polycarboxylic acid and a high-range AE water reducing agent are used.

According to the present invention, a concrete mix composition for producing a railroad (or railway) PC sleeper that is a heavyweight concrete product, which falls within the scope of the present invention, should be suitable for basic qualities such as development of an initial strength for tensioning a steel stranded wire in the concrete within 15 hours, development of long-term sustainable strength, its stability, workability, and so on, and have chloride ion resistance, freezing and thawing resistance, etc. for the purpose of long-term use.

In addition, economic efficiency of materials used for mixing concrete should also be obtained in addition to the quality. In this case, an optimal concrete mix composition can be regarded to be completed. In this aspect, the use of the fine aggregate based on the slow-cooled electric-arc-furnace oxidizing slag can be regarded to be advantageous over the fine aggregate based on the ASS.

[Mode for Invention]

Hereinafter, the present invention will be described below in greater detail by means of examples and comparative examples. The present invention should not be construed as limited to the examples set forth herein. For the convenience of description, a heavyweight concrete composition using an ASS byproduct and a heavyweight concrete composition using a slow-cooled electric-arc-furnace oxidizing slag byproduct are discriminated from each other.

[Heavyweight Concrete Composition Using Atomized Steel Slag Byproduct]

1. Preparation of Materials (A) Cement

The cement used for testing was third class (high-early-strength) cement in accordance with KS L 5201 (Portland cement).

(B) Ground Granulated Blast-Furnace Slag

Type III ground granulated blast-furnace slag having a standardized fineness (specific surface area) of 4000 to 6000 $cm^2/g$ in accordance with KS F 2563 (ground granulated blast-furnace slag for use in concrete) was used.

(C) Sand

The fine aggregate having quality characteristics in accordance with KS F 2526 (concrete aggregate) was used.

(D) ASS

The ASS used for testing was relatively large particles having a fineness modulus of 3.06, a very low water absorption of 0.22%, and an amount passing No. 200 sieve and a stability of 0.8%. Particularly, the ASS with a density of 3.48, which was about 1.35 times as heavy as a typical natural fine aggregate, was used.

(E) Coarse Aggregate (a Maximum Size of About 20 mm)

The coarse aggregate satisfying rules in accordance with KS F 2526 (concrete aggregate) was used.

(F) Fiber Reinforcement

A nylon fiber reinforcement with a standard length of 6 to 12 mm was used as the fiber stiffener.

(G) Chemical Admixture for Concrete

The chemical admixture used for testing was a high-range AE water reducing agent based on polycarboxylic acid.

Amounts of these components listed in Table 1 below were uniformly mixed, and then specimens for railroad (or railway) sleepers were manufactured as follows.

First, each mixture was poured into the corresponding mold, left at room temperature for about two hours, and then a temperature was raised to 55 degrees Celsius at a rate of about 15 degrees Celsius or less per hour.

Thereafter, the mixture was kept for about six hours, a temperature was lowered at a rate of about 10 degrees Celsius or less per hour, and the mixture was left at room temperature for about two hours. The mold was removed, and the mixture was wet-cured to obtain a specimen. Mechanical properties of each specimen were estimated, and are listed in Table 2 below.

TABLE 1

| | Amount of material used per unit volume of concrete (kg/m³) | | | | | | | |
|---|---|---|---|---|---|---|---|---|
| | | Binder | | Fine aggregate | | Coarse | Fiber | Chemical |
| Specimen | Water | HESC | GGBFS | Sand | ASS | aggregate | reinforcement | admixture |
| Comp. Example 1 | 147 | 470 | — | 694 | — | 1066 | — | 3.76 |
| Comp. Example 2 | 147 | 392 | 98 | 667 | — | 1069 | — | 3.68 |
| Comp. Example 3 | 142 | 473 | — | — | 974 | 1046 | — | 3.78 |
| Example 1 | 137 | 382 | 95 | — | 968 | 1053 | — | 3.34 |
| Example 2 | 137 | 373 | 93 | — | 978 | 1055 | 0.6 | 3.73 |

Note: HESC indicates high-early-strength cement, GGBFS indicates ground granulated blast-furnace slag, and ASS indicates atomized steel slag.

TABLE 2

| Specimen | | | Comp. Example 1 | Comp. Example 2 | Comp. Example 3 | Example 1 | Example 2 |
|---|---|---|---|---|---|---|---|
| Compressive Strength (MPa) | 1 day | | 36 | 30 | 35 | 33 | 32 |
| | 28 days | | 55 | 56 | 54 | 58 | 57 |
| | 56 days | | 59 | 64 | 59 | 66 | 64 |
| 28-day splitting tensile strength (MPa) | | | 3.9 | 4.2 | 4.5 | 4.4 | 4.6 |
| Freezing-thawing resistance (%), (after 300 cycles) | | | 86 | 89 | 88 | 92 | 91 |
| Chloride ion penetration resistance[1] (coulombs) (28-day aging) | | | 2,879 | 1,567 | 2,845 | 1,438 | 1,407 |
| Content of heavy metal in concrete (mg/kg) | $Cu^{2)}$ | 200≧ | 0.673 | 0.184 | undetected | 0.080 | — |
| | As | 20≧ | 1.841 | 2.046 | 0.952 | 0.768 | — |
| | Zn | 800≧ | 42.8 | 38.1 | 77.1 | 62.5 | — |
| | Ni | 160≧ | 4.83 | 6.55 | 3.55 | 4.04 | — |

TABLE 2-continued

| Specimen | | Comp. Example 1 | Comp. Example 2 | Comp. Example 3 | Example 1 | Example 2 |
|---|---|---|---|---|---|---|
| CN— | 120≧ | undetected | undetected | undetected | undetected | — |
| Phenol | 20≧ | undetected | undetected | undetected | undetected | — |
| PCBs[4] | 12≧ | undetected | undetected | undetected | undetected | — |
| Cd[3] | 100≧ | undetected | undetected | undetected | undetected | — |
| Hg | 1000≧ | undetected | undetected | undetected | undetected | — |
| Pb | 1000≧ | 38 | 32 | 29 | 21 | — |
| $Cr^{+6}$ | 1000≧ | Undetected | undetected | undetected | undetected | — |

Note:
[1]The chloride ion penetration resistance: testing method for the resistance of concrete to chloride ion penetration by electrical conductance according to KS F 2711.
[2]The heavy metals from Cu to PCBs: standard method for the examination of soil pollution on the basis of potential soil pollution of factories and industrial areas (the Ministry of Environment).
[3]The heavy metals from Cd to $Cr^{+6}$: RoHS IEC 62321 test standards (wherein RoHS stands for Restriction of Hazardous Substances Directive).

4) PCBs: polychlorinated biphenyls

In this manner, the concrete composition for PC sleepers according to the present invention shows excellent strength, chloride ion resistance, and freezing-thawing resistance characteristics, contains a large quantity of blast-furnace slag and steel slag that are industrial wastes replacing cement and a natural aggregate, and is eco-friendly in the aspect of reducing carbon dioxide ($CO_2$) emission and preventing the exhaustion of natural aggregate. Further, the present invention shows a freezing and thawing resistance of about 106% to 107% (improved durability), compared to an existing PC sleeper (Comparative Example 1), and can be expected to increase an endurance period of the PC sleeper and cut down the maintenance and repair costs of the PC sleeper in the future.

[Heavyweight Concrete Composition Using Slow-Cooled Electric-Arc-Furnace Oxidizing Slag]

1. Preparation of Materials (A) Cement

The cement used for testing was the third class (high-early-strength) cement in accordance with KS L 5201 (Portland cement).

(B) Ground Granulated Blast-Furnace Slag

Type III ground granulated blast-furnace slag having a standardized fineness (specific surface area) of 4000 to 6000 $cm^2/g$ in accordance with KS F 2563 (ground granulated blast-furnace slag for use in concrete) was used.

(C) Sand

The fine aggregate having quality characteristics in accordance with KS F 2526 (concrete aggregate) was used.

(D) Slow-Cooled Electric-Arc-Furnace Oxidizing Slag

The slow-cooled electric-arc-furnace oxidizing slag used for testing had physical properties, aggregate gradation, and chemical composition as listed in Tables 3 to 5 below.

Table 3 represents the physical properties of the slow-cooled electric-arc-furnace oxidizing slag.

Table 4 represents the characteristics of aggregate gradation of the slow-cooled electric-arc-furnace oxidizing slag.

Table 5 represents the chemical composition of the slow-cooled electric-arc-furnace oxidizing slag.

TABLE 3

| Fineness modulus | Density ($g/cm^3$) | Absorption (%) | Amount passing No. 200 sieve (%) | Unit weight ($kg/m^3$) | Alkali aggregate reaction (chemical method) |
|---|---|---|---|---|---|
| 3.21 | 3.40 | 1.81 | 0.12 | 3,568 | Harmlessness |

TABLE 4

| | Percent passing according to sieve nominal dimension (%) | | | | | | |
|---|---|---|---|---|---|---|---|
| | 10 mm | 5 mm | 2.5 mm | 1.2 mm | 0.6 mm | 0.3 mm | 0.15 mm |
| Measured results | 100 | 99.0 | 78.7 | 50.2 | 30.1 | 19.0 | 6.2 |
| Gradation range | 100 | 90-100 | 80-100 | 50-90 | 25-65 | 10-35 | 2-15 |

TABLE 5

| | Chemical composition (%) | | | |
|---|---|---|---|---|
| | Magnesium oxide (MgO) | Calcium oxide (CaO) | Iron(II) oxide (FeO) | Basicity ($CaO/SiO^2$) |
| Measured results | 6.6 | 24.1 | 26.0 | 1.3 |
| Reference | ≦10.0 | ≦40.0 | ≦50.0 | ≦2.0 |

(E) Coarse Aggregate (a Maximum Size of About 20 mm)

The coarse aggregate satisfying rules in accordance with KS F 2526 (concrete aggregate) was used.

(F) Chemical Admixture for Concrete

A high-range AE water reducing agent based on polycarboxylic acid was used as the chemical admixture used for testing.

Amounts of these components listed in Table 6 below were uniformly mixed. Then, each mixture was poured into the corresponding mold, subjected to a steam curing process (in which the poured mixture was left at room temperature for about two hours, a temperature was raised to 55 degrees Celsius at a rate of about 15 degrees Celsius or less per hour, the mixture was kept for about six hours, a temperature was lowered at a rate of about 10 degrees Celsius or less per hour, and the mixture was left at room temperature for about two hours). Then, the mold was removed, and the poured mixture was wet-cured to obtain a specimen. Mechanical properties of each specimen were estimated, and are listed in Table 7 below.

TABLE 6

| | Amount of material used per unit volume of concrete (kg/m³) | | | | | | |
|---|---|---|---|---|---|---|---|
| | | Binder | | Fine aggregate | | Coarse | Chemical |
| Specimen | Water | HESC | GGBFS | Sand | ASS | SCEAFOS | aggregate | admixture |
| Comp. Example 1 | 147 | 470 | — | 694 | — | — | 1066 | 3.76 |
| Comp. Example 2 | 147 | 392 | 98 | 667 | — | — | 1069 | 3.68 |
| Comp. Example 3 | 142 | 382 | 95 | — | 968 | — | 1053 | 3.34 |
| Example 1 | 144 | 344 | 148 | — | — | 1042 | 939 | 3.20 |
| Example 2 | 144 | 328 | 219 | — | — | 999 | 922 | 3.55 |

Note: HESC indicates high-early-strength cement, GGBFS indicates ground granulated blast-furnace slag, ASS indicates atomized steel slag, and SCEAFOS indicates slow-cooled electric-arc-furnace oxidizing slag.

TABLE 7

| Specimen | | | Comp. Example 1 | Comp. Example 2 | Comp. Example 3 | Example 1 | Example 2 |
|---|---|---|---|---|---|---|---|
| Compressive Strength (MPa) | 1 day | | 36 | 30 | 33 | 39 | 33 |
| | 28 days | | 55 | 56 | 58 | 59 | 64 |
| | 56 days | | 59 | 64 | 66 | 68 | 70 |
| 28-day splitting tensile strength (MPa) | | | 3.9 | 4.2 | 4.4 | 4.6 | 4.4 |
| Freezing-thawing resistance (%), (after 300 cycles) | | | 86 | 89 | 92 | 92 | 91 |
| Chloride ion penetration resistance[1] (coulombs) (28-day aging) | | | 2,879 | 1,567 | 1,438 | 1,024 | 894 |
| Content of heavy metal in concrete (mg/kg) | $Cu^{2)}$ | $200\geqq$ | 0.673 | 0.184 | 0.080 | 0.135 | 0.124 |
| | As | $20\geqq$ | 1.841 | 2.046 | 0.768 | 1.052 | 0.984 |
| | Zn | $800\geqq$ | 42.8 | 38.1 | 62.5 | 72.5 | 79.2 |
| | Ni | $160\geqq$ | 4.83 | 6.55 | 4.04 | 5.43 | 4.68 |
| | CN— | $120\geqq$ | undetected | undetected | undetected | undetected | undetected |
| | Phenol | $20\geqq$ | undetected | undetected | undetected | undetected | undetected |
| | $PCBs^{4)}$ | $12\geqq$ | undetected | undetected | undetected | undetected | undetected |
| | $Cd^{3)}$ | $100\geqq$ | undetected | undetected | undetected | undetected | undetected |
| | Hg | $1000\geqq$ | undetected | undetected | undetected | undetected | undetected |
| | Pb | $1000\geqq$ | 38 | 32 | 21 | 42 | 38 |
| | $Cr^{+6}$ | $1000\geqq$ | undetected | undetected | undetected | undetected | undetected |

Note:
[1] The chloride ion penetration resistance: testing method for resistance of concrete to chloride ion penetration by electrical conductance in accordance with KS F 2711.
[2] The heavy metals from Cu to PCBs: standard method for the examination of soil pollution on the basis of potential soil pollution of factories and industrial areas (the Ministry of Environment).
[3] The heavy metals from Cd to $Cr^{+6}$: RoHS IEC 62321 test standards (wherein RoHS stands for Restriction of Hazardous Substances Directive)

4) PCBs: polychlorinated biphenyls

Comparative Example 1 indicates a mixing ratio of an existing PC sleeper, i.e. an example of using high-early-strength cement and a natural fine aggregate (sand). Comparative Example 2 indicates an example of using high-early-strength cement and ground granulated blast-furnace slag at an amount of 15 to 30 parts by weight on the basis of 100 parts by weight high-early-strength cement. Comparative Example 3 indicates an example of using high-early-strength cement and ground granulated blast-furnace slag at an amount of 15 to 30 parts by weight on the basis of 100 parts by weight high-early-strength cement, and ASS as an alternative to a fine aggregate at an amount of 220 to 280 parts by weight on the basis of 100 parts by weight high-early-strength cement.

As in Examples 1 and 2, the concrete composition for PC sleepers that are heavyweight concrete products, which falls within the scope of the present invention, uses a large quantity of ground granulated blast-furnace slag as an alternative to cement and a large quantity of slow-cooled electric-arc-furnace oxidizing slag as an alternative to a natural aggregate, but it shows excellent long-term strength and high resistance to chloride ions, compared to the existing PC sleeper composition (Comparative Example 1) or when ASS is used (Comparative Example 3), and has the same durability, such as freezing-thawing resistance, as the comparative example.

This technology of the present invention contains a large quantity of blast-furnace slag and slow-cooled electric-arc-furnace oxidizing slag that are industrial byproducts replacing cement and a natural aggregate, and is eco-friendly in the aspect of reducing carbon dioxide ($CO_2$) emission and preventing the exhaustion of natural aggregate. Further, in comparison with the existing PC sleeper (Comparative Example 1), an effect of increasing long-term strength (about 115% to 118%) enhances the freezing-thawing resistance of about 106% to 107% (improved durability). In the estimation of the chloride ion penetration resistance, electrical conductivity resistance is greatly improved by about 2.5 to 3 times as high as the condition of the existing PC sleeper, so that it can be expected to increase an endurance period of the PC sleeper and cut down maintenance and repair costs of the PC sleeper in the future.

The invention claimed is:
1. A heavy weight concrete composition using slag byproducts comprising:
on the basis of 100 parts by weight high-early-strength Portland cement, 42 to 67 parts by weight ground granu- lated blast-furnace slag, 290 to 310 parts by weight slow-cooled electric-arc-furnace oxidizing slag having a density of 3.3 to 3.8 and used as a fine aggregate, 260 to 290 parts by weight coarse aggregate, and 40 to 45 parts by weight water.

2. The heavy weight concrete composition according to claim 1, further comprising a chemical admixture for concrete.

3. A heavy weight concrete composition using slag byproducts comprising:
on the basis of 100 parts by weight high-early-strength Portland cement, 15 to 30 parts by weight ground granulated blast-furnace slag, 220 to 280 parts by weight atomized steel slag having a density of 3.4 to 3.6 and used as a fine aggregate, 230 to 300 parts by weight coarse aggregate, and 30 to 40 parts by weight water.

4. The heavy weight concrete composition according to claim 3, further comprising a fiber reinforcement, a chemical admixture, or a combination thereof.

* * * * *